US008797211B2

(12) United States Patent
Valdes-Garcia

(10) Patent No.: US 8,797,211 B2
(45) Date of Patent: Aug. 5, 2014

(54) MILLIMETER-WAVE COMMUNICATIONS USING A REFLECTOR

(75) Inventor: Alberto Valdes-Garcia, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 13/024,881

(22) Filed: Feb. 10, 2011

(65) Prior Publication Data

US 2012/0206299 A1    Aug. 16, 2012

(51) Int. Cl.
*H04B 7/145* (2006.01)
(52) U.S. Cl.
CPC ..................................... *H04B 7/145* (2013.01)
USPC .............................. 342/367; 455/15; 455/63.4
(58) Field of Classification Search
CPC ............ H01Q 15/14; H04B 7/14; H04B 7/15; H04B 7/145; H04B 7/15528; H04B 7/15592
USPC .................................................. 342/359, 367
See application file for complete search history.

(56) References Cited

U.S. PATENT DOCUMENTS

| | | | | |
|---|---|---|---|---|
| 4,114,988 | A | * | 9/1978 | Enomoto ....................... 359/874 |
| 4,211,922 | A | * | 7/1980 | Vaerewyck et al. ......... 250/203.4 |
| 4,342,033 | A | * | 7/1982 | de Camargo .................. 343/753 |
| 4,701,037 | A | * | 10/1987 | Bramer .......................... 359/874 |
| 5,697,063 | A | | 12/1997 | Kishigami et al. |
| 5,819,164 | A | | 10/1998 | Sun et al. |
| 6,219,553 | B1 | | 4/2001 | Panasik |
| 7,164,932 | B1 | * | 1/2007 | Sato et al. ................... 455/562.1 |
| 7,209,703 | B1 | * | 4/2007 | Yarkosky .......................... 455/9 |
| 7,432,858 | B2 | | 10/2008 | Arndt et al. |
| 7,587,173 | B2 | | 9/2009 | Hoffmann et al. |
| 2002/0034958 | A1 | * | 3/2002 | Oberschmidt et al. ........ 455/517 |
| 2005/0054299 | A1 | | 3/2005 | Hein et al. |

(Continued)

FOREIGN PATENT DOCUMENTS

| | | | |
|---|---|---|---|
| GB | 2080001 A | 1/1982 | |
| JP | 06200584 A * | 7/1994 | ................ E04B 9/00 |

(Continued)

OTHER PUBLICATIONS

Pang, G. "Information Technology Based on Visible LEDs for Optical Wireless Communications," IEEE TENCON 2004, pp. 395-398.*

(Continued)

*Primary Examiner* — Gregory C Issing
(74) *Attorney, Agent, or Firm* — Tutunjian & Bitetto, P.C.; Anne V. Dougherty

(57) ABSTRACT

Methods and systems for establishing a non-line of sight millimeter wave connection that include a transmitter unit having beam-steering capability, a receiver unit having beam-steering capability, and a reflecting unit in a position having a line-of-sight path to the transmitter unit and the receiver unit. The reflecting unit includes an attachment mechanism configured to attach to a mounting point on an object or surface, a reflecting surface that is reflective to millimeter-wave radiation, and an adjustable pivot connected between the attachment mechanism and the reflecting surface configured to permit directional positioning of the reflecting surface relative to the attachment mechanism.

20 Claims, 7 Drawing Sheets

(56) References Cited

U.S. PATENT DOCUMENTS

| | | | |
|---|---|---|---|
| 2006/0084379 A1* | 4/2006 | O'Neill | 455/25 |
| 2007/0287384 A1* | 12/2007 | Sadri et al. | 455/63.4 |
| 2008/0108369 A1* | 5/2008 | Visotsky et al. | 455/455 |
| 2009/0124199 A1 | 5/2009 | Maltsev et al. | |
| 2009/0219903 A1 | 9/2009 | Alamouti et al. | |
| 2009/0249787 A1* | 10/2009 | Pfahl et al. | 60/641.11 |
| 2010/0119234 A1* | 5/2010 | Suematsu et al. | 398/135 |

FOREIGN PATENT DOCUMENTS

| | | | | |
|---|---|---|---|---|
| JP | 2005244362 A | * | 9/2005 | H04B 7/145 |
| JP | 2006333117 A | | 12/2006 | |
| WO | 2007136292 A1 | | 11/2007 | |
| WO | WO 2007136290 A1 | * | 11/2007 | H01Q 1/00 |

OTHER PUBLICATIONS

Langen, B. et al., "Reflection and Transmission Behaviour of Building Materials At 60 Ghz", in Proceedings of Personal, Indoor and Mobile Radio Communications, Sep. 1994, pp. 505-509.

Maltsev, A. et al., "Experimental Investigations of 60 GHz WLAN Systems in Office Environment", IEEE Journal no Selected Areas in Communications, vol. 27, No. 8, Oct. 2009, pp. 1488-1499.

Nakata, Y. et al., "In-House Wireless Communication System Using Infrared Radiation", New World of the Information Society, Proceedings of the Seventh international Conference on Computer Communication, Oct.-Nov. 1984, Abstract.

Vento, R. at al., "Experimental Characterization of a Direct Sequence Spread Spectrum System for In-House Wireless Infrared Communications", IEEE Transactions on Consumer Electronics, vol. 45, No. 4, Nov. 1999, pp. 1038-1045.

* cited by examiner

MILLIMETER-WAVE COMMUNICATIONS USING A REFLECTOR

BACKGROUND

1. Technical Field

The present invention relates to communication systems and, more particularly, to data communication systems operating at millimeter-scale wavelengths.

2. Description of the Related Art

There are several prominent commercial applications for data communication systems at millimeter-wave (mmWave) frequencies (i.e. frequencies having a corresponding wavelength on the order of millimeters). For example, the 7 GHz Industrial, Scientific and Medical (ISM) band, which operates at a frequency of 60 GHz, is useful for multi-gigabit per second Wireless Personal Area Networks (WPANs) that consider both home and office applications. Another example is outdoor building-to-building links and Metropolitan Area Networks (MPAN) using E-band (71 to 76 GHz and 81 to 86 GHz). mmWave energy is highly directional and it can be easily absorbed by common objects (e.g. furniture, monitors, human bodies, etc.). For these reasons, the ability to establish non-line-of-sight (NLOS) links is helpful for practical mmWave communication systems.

SUMMARY

A reflector is shown that includes an attachment mechanism configured to attach to a mounting point on an object or surface, a reflecting surface that is reflective to millimeter-wave (mmWave) radiation, and an adjustable pivot connected between the attachment mechanism and the reflecting surface for permitting directional positioning of the reflecting surface relative to the attachment mechanism.

A communication system is shown that includes a millimeter-wave (mmWave) transmitter unit having beam-steering capability, an mmWave receiver unit having beam-steering capability, and a reflecting unit disposed in a position having a line-of-sight path to the transmitter unit and the receiver unit. The reflecting unit further includes a flexible mount for steering a reflective surface into a direction that forms a non-line-of-sight path between the transmitter unit and the receiver unit and a signal strength detector configured to detect mmWave radiation.

A method for establishing a non-line-of-sight connection that includes providing a transmitter unit, providing a receiver unit, providing a reflector having a flexible mount at a location in a line-of-sight path from both the transmitter unit and the receiver unit, adjusting the flexible mount of the reflector into a direction that forms a non-line-of-sight path between the transmitter unit and the receiver unit.

A method for establishing a non-line-of-sight connection is shown that includes providing a reflector having a flexible mount at a location in a line-of-sight path from both a transmitter unit and a receiver unit, adjusting the transmitter unit to steer a beam toward a reflector unit, adjusting the receiver unit to steer a beam toward a reflector unit, and if the receiver unit cannot form a connection with the transmitter unit through the reflector, adjusting the flexible mount of the reflector into a direction that forms a non-line-of-sight path between the transmitter unit and the receiver unit.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Phased-array radios with electronic beam-steering capabilities permit the use of highly directional millimeter-wave (mmWave) transmission and reception through non-line-of-sight (NLOS) paths. Such NLOS paths may include reflections from environmental objects. In some cases however, the distance to an available reflective surface may be too long to be reached with sufficient signal strength, there may not be a line-of-sight (LOS) path to a reflector, or a reflective surface may not exist at all. In addition, the ability to set the direction of energy transmission/reception with accuracy and the process to search for that direction both substantially increase the system complexity and cost.

Figure 1:
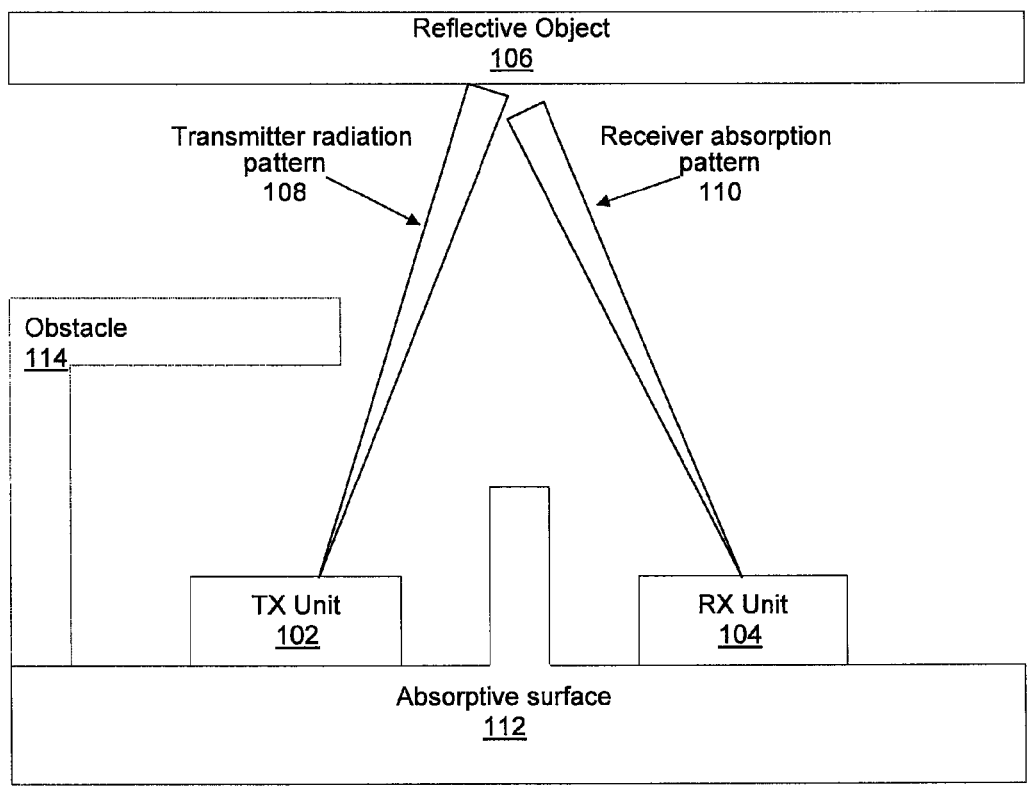
FIG. 1 is a diagram showing an exemplary millimeter-wave (mmWave) system in an office environment.

Referring now to the drawings in which like numerals represent the same or similar elements and initially to FIG. 1, an office arrangement is shown for a mmWave transmission/reception system. A transmission unit 102 and a reception unit 104 are disposed within an environment, such as an office or home environment, having a variety of obstacles and surfaces. In FIG. 1, the most direct path between transmission unit 102 and reception unit 104 is blocked by an absorptive surface 112. Additional obstacles 114 exist to further constrain possible beam directions.

Frequently the range of options for placing transmitters 102 and receivers 104 is limited by the environment's configuration. For example, such devices are placed within range of electrical power and network infrastructure to operate. However, as shown in FIG. 1, and as noted above, mmWave emissions are readily blocked by solid objects, such that there is no direct line-of-sight path available. Transmitter 102 and receiver 104 are equipped with beam steering ability, such that they are able to search for the transmitter radiation pattern 108 and the receiver absorption pattern 110 which provide an optimal connection.

In the example of FIG. 1, the transmission unit 102 and the reception unit 104 find a reflective object 106 (for example, the ceiling) and direct their respective radiation patterns in such a way as to establish an NLOS mmWave connection. Doing so permits the system to avoid obstructions, but may cause trouble from signal attenuation if the reflective object 106 is too far away. Indeed, a reflective object 106 may not exist in a given environment. It is worth noting that this is not a concern for low-frequency communications, such as WiFi. The radiation employed in low-frequency communications can pass through most materials, obviating the need for NLOS paths, but the present principles may still be applied in such cases to improve signal quality.

Figure 2:
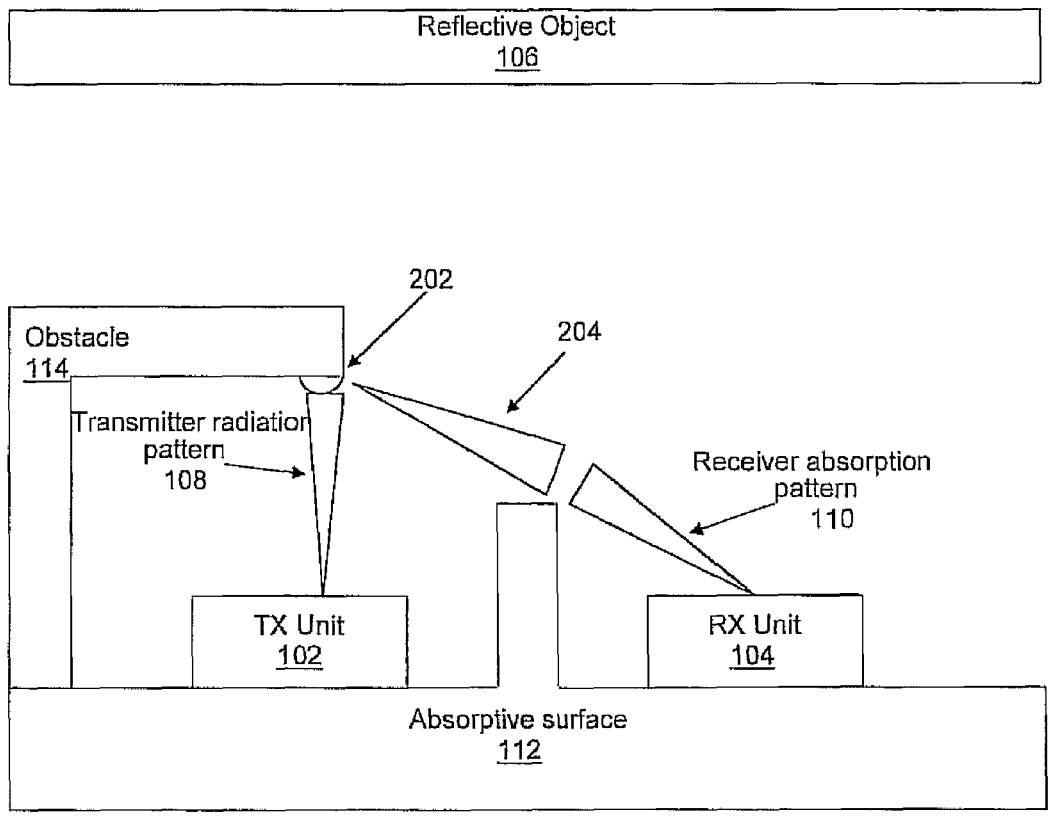
FIG. 2 is a diagram showing an exemplary mmWave system including a reflector.

Referring now to FIG. 2, another office arrangement shows having an additional installation of a passive reflector 202. In this case, a convex reflector 202 has been installed on obstacle 114. The transmitter unit 102 now aims its radiation pattern 108 toward the convex (e.g., spherical) reflector 202, producing reflected radiation pattern 204. Similarly, receiver unit 104 aims its reception absorption pattern 110 at the spherical reflector 202, establishing the NLOS connection. In comparison with FIG. 1, the distance traveled by the beams 108, 204, and 110 and, hence, the attenuation of the beams is reduced through the use of reflector 202. The reflector 202 may be placed strategically and may be a passive device, such that it does not need to be tethered to a particular location.

The use of reflector 202 also means that beam-steering accuracy in the transmitter 102 and the receiver 104 may be relaxed, and that lower transmission/reception gain may be employed, permitting for less complexity in the devices as well as lower power consumption—to significantly reduce cost. Further being a passive device, the cost of the reflector 202 may be made very low, particularly in comparison to an additional transmission or reception module.

Reflectors may be made out of any material that is reflective to the desired frequencies. Thus, metallic reflectors may be employed, but the present principles should not be seen as limited to metallic reflectors. Those skilled in the art will be able to construct a reflector out of an appropriate material and shape that will efficiently reflect mmWave radiation. In general, a reflectivity (reflection loss) of less than 2 dB is preferable. Some materials which may be used to form a reflector according to the present principles include marble, plasterboard, plasterwork, glass, metalized glass, and formica. A further example of a suitable material is the material used in office whiteboards, showing a reflectivity of less than 1 dB. It should be noted that the thickness of the material is relevant, such that if the material is too thin the material will be less effective as a reflector.

Figure 3:
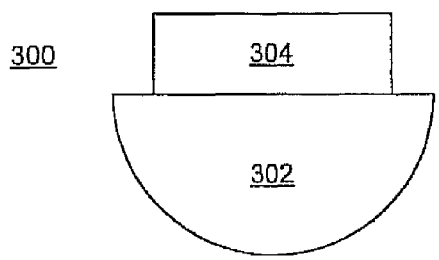
FIG. 3 is a diagram showing an embodiment of a reflector according to the present principles.

Referring now to FIG. 3, an exemplary reflector 300 is shown. The reflector 300 has a reflective surface 302 and an attachment mechanism 304. This attachment mechanism 304 may comprise magnets, an adhesive, or a physical attachment device such as a clip. By employing a spherical surface, the reflective surface 302 can effectively reflect a transmitter radiation pattern 108 to any point having a line-of-sight path to the reflector 300. The use of magnetic or physical attachment permits the reflector 300 to be placed in a removable manner that is especially useful for temporary installations. Using a flat reflector or ellipsoidal mirror would result in limited directional ability and/or beam spreading/distortion. In contrast, a spherical mirror may be attached to any surface that is visible to both devices.

Figure 4:
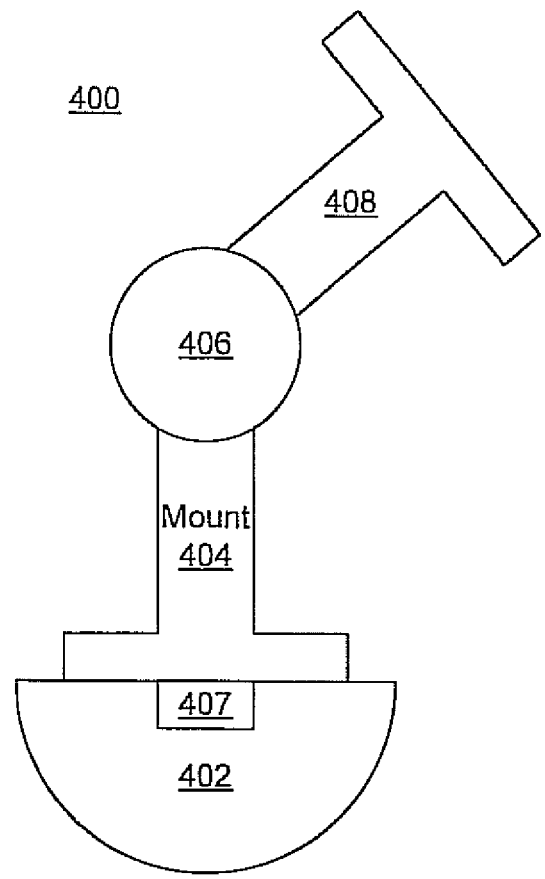
FIG. 4 is a diagram showing an embodiment of a reflector having a positioning element according to the present principles.

Referring now to FIG. 4, an alternative reflector 400 is shown. A spherical reflector 402 is disposed on a mounting piece 404. This mounting piece 404 in turn is connected by a joint 406 to an attachment mechanism 408. The joint 406 may include a motor or servo mechanism with the ability to automatically adjust the positioning of the reflector. The joint 406 may be controlled using a reflector control system 407 that may take explicit commands or may automatically determine when and to what position to change the reflector, as discussed below. As above, the attachment mechanism 408 attaches the reflector 400 to any surface that is visible to both transmission unit 102 and receiving unit 104. The joint 406 may be a simple elbow joint or may comprise a ball-and-socket joint, permitting for a greater range of motion. The joint 406 permits for greater freedom in placement over the reflector 300 discussed above in FIG. 3. In this way the reflector 400 may still be used, even if the optimal surface for the attachment mechanism 408 is, e.g., around a corner or in some other way poorly positioned. The reflector 400 may also be used with alternatively shaped mirrors, wherein specific aiming may be needed to provide an adequate connection. If a flat reflector is employed, the join allows for adjustment of the reflection angle.

Figure 5:
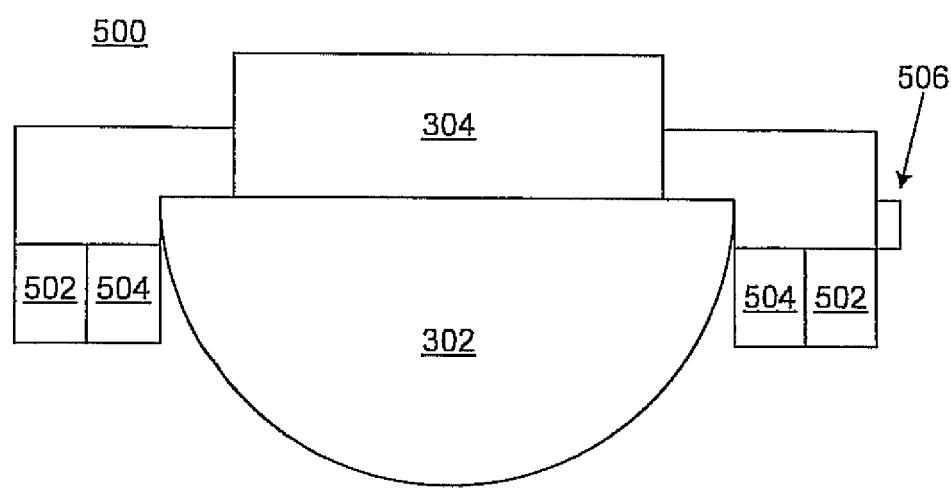
FIG. 5 is a diagram showing an embodiment of a reflector having a mmWave detector and indicator.

Referring now to FIG. 5, a reflector is shown having a power detector/indicator 502. In addition to a reflector 302 and mounting attachment 304, the reflector 500 includes one or more power detectors 504 and indicators 502. The power detectors 504 detect the presence of mmWave radiation, which shows that the transmitting unit 102 has aimed its beam at the reflector 500. The power detectors 504 may therefore comprise a simple antenna and a device capable of detecting the presence of mmWave radiation. For example, a Schottky diode may be used to perform such detection. Detectors may be placed at multiple points around the detector 500, such that they will successfully detect mmWave radiation regardless of the direction the radiation comes from.

An indicator 502 is in communication with the detectors, such that when a detector 504 triggers under mmWave radiation, a user is informed. The indicators 502 may include, e.g., an LED indication that illuminates when the detectors 504 trigger. Alternatively or in addition, the indicator 502 may include a speaker configured to produce an audible alert, such as a "chirp" or tone, when detectors 504 have been triggered. This may be optionally configured using a physical switch 506 which permits a user to manually determine whether a visual indicator, an audible indicator, both, or neither is used. The indicators 502 may be battery powered or may receive power from a wall outlet. In the alternative, the detectors 504 may be configured to generate a voltage when receiving mmWave power, and this voltage may in turn be used to power the indicator 502. The indicator 502 may further be configured to communicate signal strength, whether through intensity or pattern of indication. For example, the indicator 502 may turn an LED on and off with a frequency proportional to the strength of the signal. In this way, a user is able to ensure that the reflector 500 is properly mounted in a position where the reflector 500 can receive mmWave transmissions.

In addition, the detector 504 may be operably connected to a joint mechanism 406, if the reflector is attached to an adjustable mount as shown in FIG. 4. This permits the detector 504 to automatically control the position of the reflector in the event that an NLOS connection cannot be established in the original position.

Figure 6:
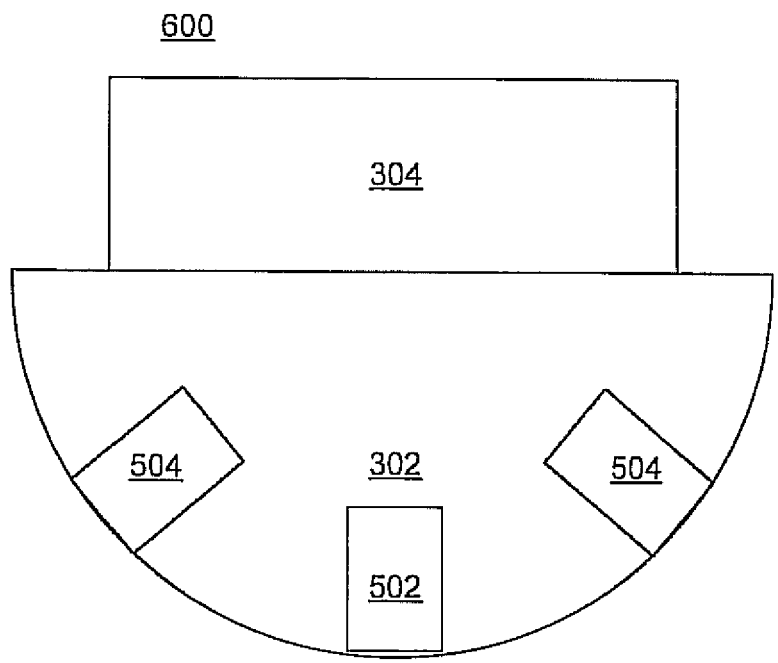
FIG. 6 is a diagram showing an embodiment of a reflector having a mmWave detector and indicator disposed within the reflective surface.

Referring now to FIG. 6, a reflector 600 is shown having detectors 504 and indicators 502 disposed within the reflective surface 602. To reduce the size of the reflector 600, as well as to protect the potentially fragile detectors 504 and indicator 502, the detectors 504 and indicator 502 are placed within the reflector's shell and function through the reflector. Portions of the reflective surface 602 may be made transparent, such that mmWave radiation and the indicator signal can pass through at those points. This can be accomplished, e.g., by drilling a hole in the reflective surface 602, by using a different material at these points that acts as a window, or by removing a portion of a reflective coating. The gaps in reflective surface 302 should be large enough to permit the mmWave emissions to pass through to reach the detectors 504 and for the indicator 502 to be visible. Within that constraint, the gaps should be made as small as possible to achieve minimum disruption of the reflective surface.

Figure 7:
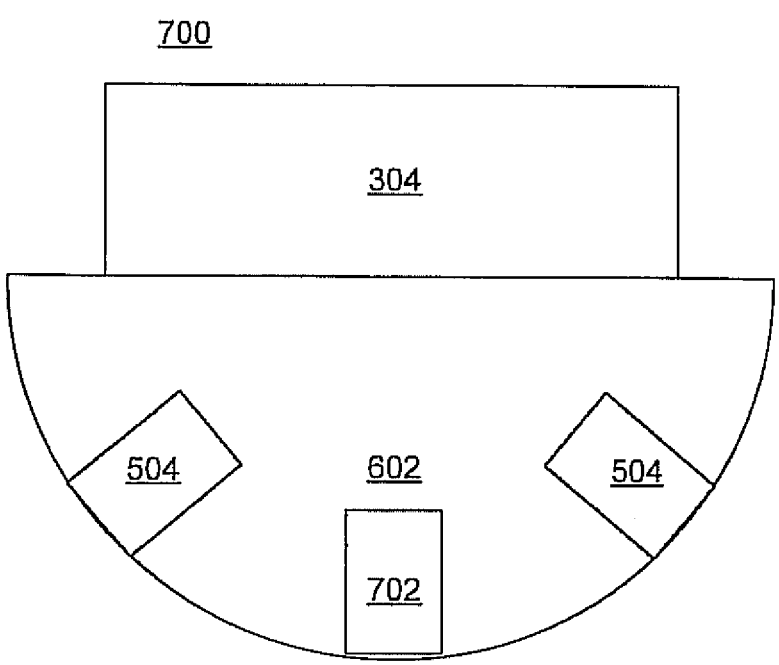
FIG. 7 is a diagram showing an embodiment of a reflector having a mmWave detector and a low-frequency broadcast device.

Referring now to FIG. 7, a reflector 700 is shown that has the ability to broadcast link status information. Instead of using a visual/audible indicator such as that described above, reflector 700 uses a low-frequency broadcast device 702 that is operably connected to the detectors 504. This may be, e.g., a WiFi device, but any sort of low-frequency broadcast that can pass through common obstacles would be suitable. The reflector 700 detects the presence of mmWave radiation and broadcasts information regarding the signal strength via low-frequency broadcast device 702. This information may range from an on-off indication, communicating that the signal strength has exceeded some threshold, or the information may contain detailed information including a measurement of signal strength as well as information relating to network identification, such that if multiple transmitter devices attempt to broadcast to a single reflector 700, the reflector 700 can differentiate between them. This is useful for network troubleshooting and diagnosis, as such information permits a network administrator to locate sources of interference.

Figure 8:
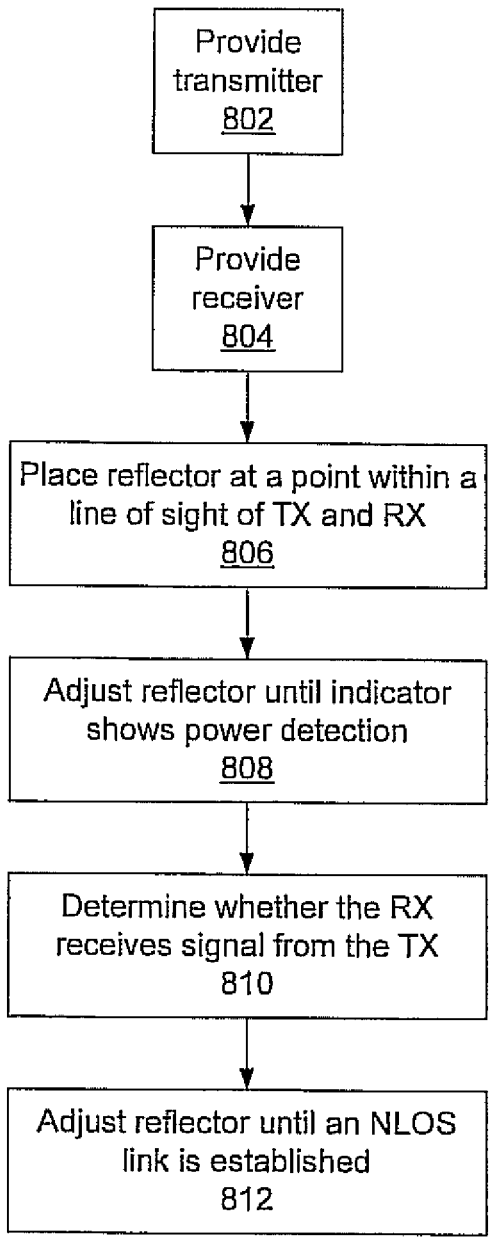
FIG. 8 is a block/flow diagram showing a method/system for establishing non-line-of-sight mmWave communication.

Referring now to FIG. 8, a block/flow diagram is shown describing a method for establishing an NLOS connection between a transmitter 102 and a receiver 104. Blocks 802 and 804 provide a transmitter 102 and receiver 104 respectively, such as those shown above in FIG. 2. Block 806 places a reflector 202 at some point visible to both the transmitter 102 and the receiver 104. As noted above, this may involve any type of affixation including, but not limited to, adhesive, magnets, and mechanical coupling. Block 808 adjusts the positioning of the reflector 202 such that the reflector receives sufficient signal strength from the transmitter 102, as shown by an indicator in the reflector 202. In this manner a user may find an optimal positioning and disposition for the reflector 202 in a crowded environment, such as, e.g., an office or library. The adjustment of block 808 may be performed manually or through an automatic process. For example, the reflector 808 may include logic and sensors suitable for determining the link state and automatically adjusting the position of the reflector. Block 810 then determines whether the receiver 104 has detected the reflected signal. If not, block 810 adjusts the reflector 202, again either manually or automatically, to create an NLOS link between the transmitter 102 and the receiver 104.

Figure 9:
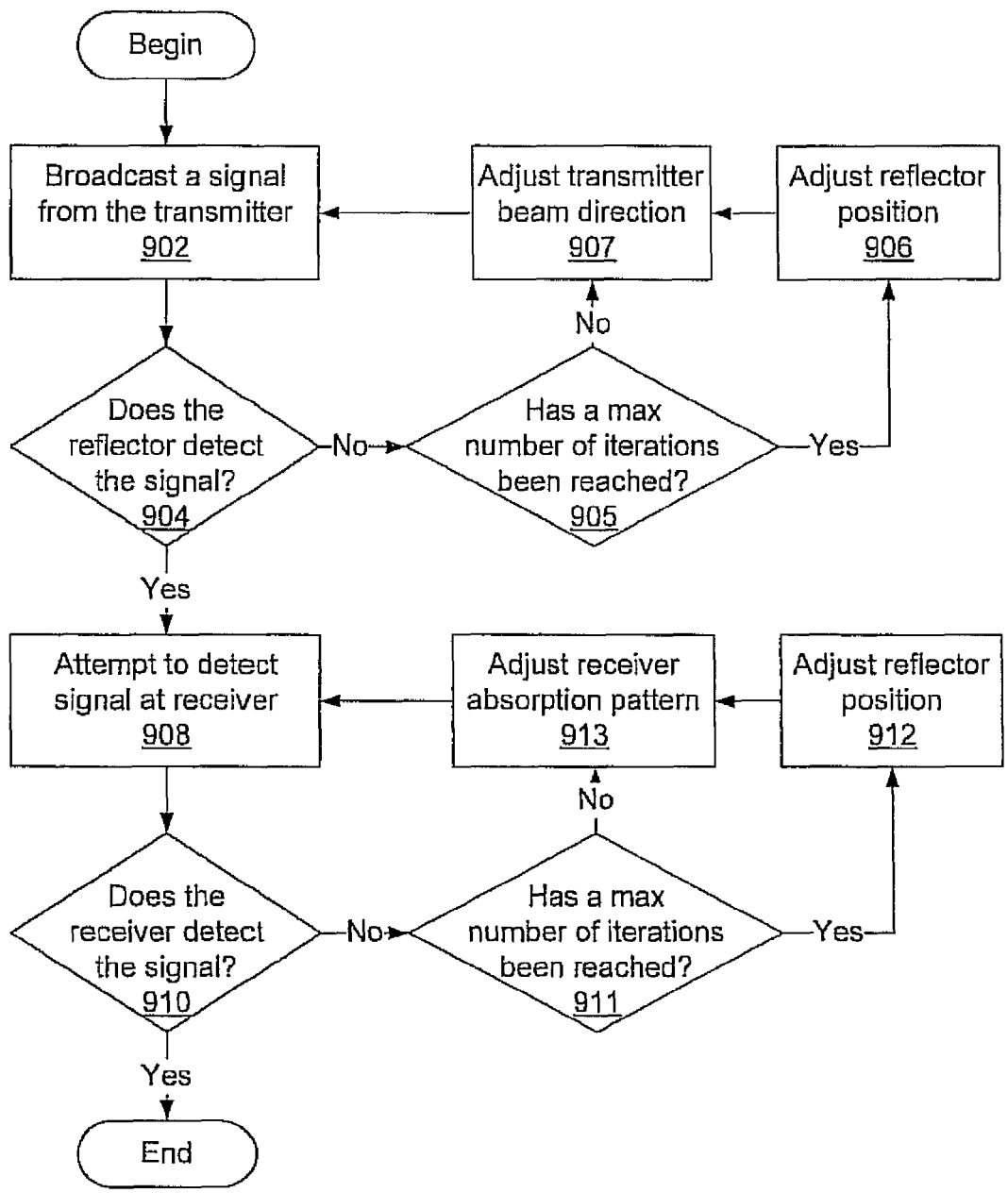
FIG. 9 is a block/flow diagram showing a method/system for establishing non-line-of-sight mmWave communication.

Referring now to FIG. 9, a method for automatically establishing an NLOS link between a transmitter 102 and a receiver 104 is shown. At block 902 the transmitter 102 begins to broadcast a signal 108. Block 904 tests whether a reflector 202 has received the signal. This may be performed, e.g., using sensors 504 as described above. The reflector 202 may have a threshold signal strength below which the reflector 202 will not report successful reception. If not, block 905 determines whether the transmitter 102 has exhausted all of its beam positions, represented by a maximum number of iterations (e.g., <100). This is performed by a processor within the transmitter 102. If there are beam positions remaining, block 907 adjusts the transmitter direction to a next beam position and returns to block 902. If there are no more beam positions remaining, block 906 adjusts the position of the reflector 202. This may be performed manually or automatically by servo motors within the reflector 202. Block 907 then resets the transmitter's beam position and block 902 begins the search for the reflector 202 again.

Once the reflector 202 detects a signal from the transmitter, block 908 attempts to detect the reflected signal at the receiver 104. Block 910 determines whether the signal is detected at the receiver 104. If a signal has been detected, then an NLOS connection has been established and the process ends. If the receiver 104 doesn't detect a signal, the receiver 104 attempts to find a better beam position. As with the transmitter 102, the receiver 104 has a finite number of possible beam positions. Block 911 determines whether the receiver 104 has exhausted all of its beam positions. If not, block 913 picks a new beam absorption pattern and returns to block 908 for another attempt. If all of the beam positions have been exhausted, block 912 adjusts the position of the reflector 202. Block 913 then resets the receiver absorption pattern and block 908 begins the search again. In this manner, the transmitter 102, receiver 104, and reflector 202 work together to automatically establish an NLOS connection.

It should be noted that the present principles are not limited to the context of short-distance (<10 m) wireless area networks or the context of in-home or in-office wireless communications. Wireless metropolitan area networks (WMAN) and other forms of network also benefit for the larger bandwidth offered by mmWave bands.

Figure 10:
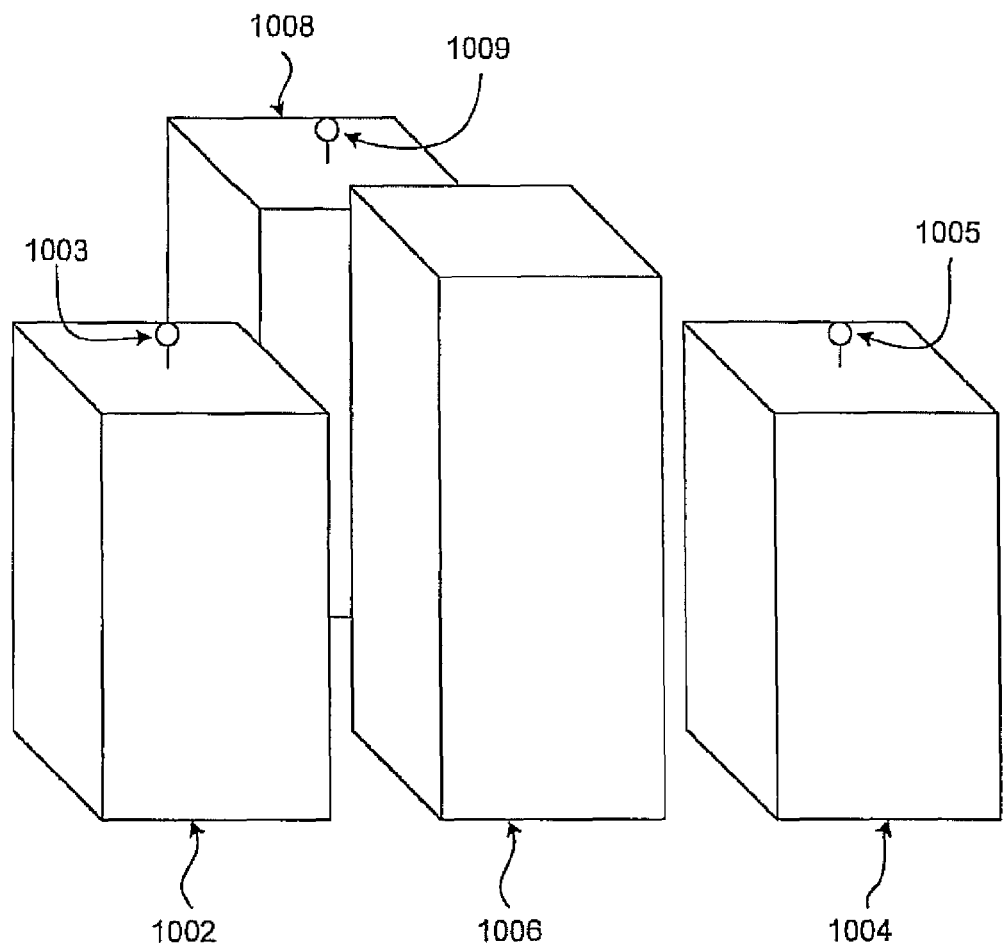
FIG. 10 is a diagram showing exemplary mmWave system in a metropolitan environment.

Referring now to FIG. 10, an example in the context of E-band building-to-building communications is shown. A first building 1002 having a transceiver 1003 needs to communicate with a second building 1004. A steerable reflector 1009 can also be employed in this case to automatically establish an NLOS path between the two buildings.

This type of system is in general less cost-sensitive than in-office arrangements. Therefore, high-performance semiconductor, packaging and antenna technology can be applied to both transmitter and receiver. To cover longer distances, higher transmitter output power and higher gain antennas are used. The attachment mechanism for the reflector is adjusted for a large-scale building, and the reflector itself is made sufficiently robust to external environment conditions such as humidity and temperature. Nevertheless, all the principles presented above apply to this system and are beneficial to make mmWave WMAN communications more flexible.

As noted above, FIGS. 8 and 9 refer to automatic adjustment of a reflector position. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
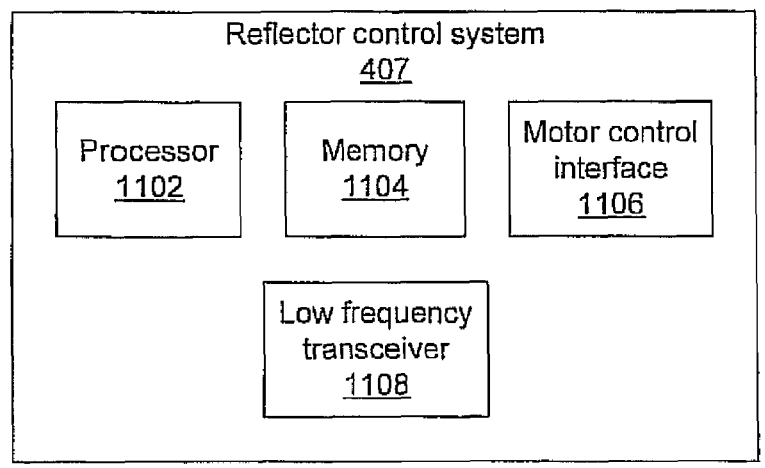
FIG. 11 is a block diagram showing an exemplary reflector control system.

Referring now to FIG. 11, a reflector control system 407 is shown. The reflector control system 407 includes a processor 1102 and a memory 1104 configured to store and execute programming to control the position of a reflector 400. In particular, the processor issues commands to motor control interface 1106, which controls a motor or servo mechanism. The processor 1102 performs this task based on information from low frequency transceiver 1108, which communicates with a transmitter and a receiver, for example receiving information as to whether the transmitter or receiver have exhausted their beam patterns in blocks 905 and 911 of FIG. 9.

Having described preferred embodiments of a system and method for mmWave communications using a reflector (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A reflector, comprising:
   an attachment mechanism connecting to a mounting point on an object or surface;
   a reflecting surface that is reflective to millimeter-wave (mmWave) radiation;
   an adjustable pivot connected between the attachment mechanism and the reflecting surface configured to permit directional positioning of the reflecting surface relative to the attachment mechanism such that a non-line-of-sight connection between an mmWave transmitter and an mmWave receiver is formed;
   a motor disposed in a joint of the adjustable pivot, configured to adjust the pivot to change the directional position of the reflecting surface relative to the attachment mechanism;
   a signal strength detector configured to measure the intensity of the mmWave radiation at the reflector; and
   a broadcast device, disposed within the reflecting surface with respect to the mmWave transmitter and receiver, configured to electromagnetically broadcast link status information for the mmWave transmitter and receiver at a frequency low enough to pass through obstacles that absorb mmWave frequencies,
   wherein the signal strength detector and the broadcast device are disposed within apertures in the reflecting surface.

2. The reflector of claim 1,
   wherein the broadcast device is connected to the signal strength detector configured to activate when signal has been detected.

3. The reflector of claim 2, wherein the broadcast device is activated when signal strength exceeds a threshold value.

4. The reflector of claim 2, wherein the broadcast device is configured to activate in a pattern that corresponds to signal strength.

5. The reflector of claim 1, wherein the reflecting surface has a convex shape.

6. The reflector of claim 1, wherein the adjustable pivot comprises an elbow joint.

7. The reflector of claim 1, wherein the adjustable pivot comprises a ball-and-socket joint.

8. The reflector of claim 1, wherein the broadcast device is configured to broadcast link status information after a received signal strength has exceeded a threshold.

9. The reflector of claim 1, wherein the broadcast device is configured to broadcast link status information that includes a measurement of signal strength from the mmWave transmitter as well as information relating to network identification for the mmWave transmitter and receiver.

10. A communication system, comprising:
a millimeter-wave (mmWave) transmitter unit configured to perform beam-steering;
an mmWave receiver unit configured to perform beam-steering; and
a reflecting unit disposed in a position having a line-of-sight path to the transmitter unit and the receiver unit, comprising:
a reflective surface;
a flexible mount for positioning the reflective surface to form a non-line-of-sight path between the transmitter unit and the receiver unit;
a motor disposed in a joint of the flexible mount, configured to change the directional position of the reflecting surface relative to an attachment mechanism;
a signal strength detector configured to detect mmWave radiation; and
a broadcast device configured to electromagnetically broadcast link status information for the mmWave transmitter and receiver at a frequency low enough to pass through obstacles that absorb mmWave frequencies,
wherein the broadcast device and the signal strength detector are disposed within apertures in the reflective surface.

11. The communication system of claim 10, wherein the mmWave transmitter unit and the mmWave receiver unit are located in or on different buildings.

12. The communication system of claim 10, wherein the mmWave transmitter unit and the mmWave receiver unit are located less than ten meters apart.

13. A method for establishing a non-line-of-sight connection comprising:
providing a reflector having a flexible mount at a location in a line-of-sight path from both a transmitter unit and a receiver unit, the reflector further detecting signal strength using a signal strength detector;
adjusting the transmitter unit to steer a beam toward the reflector;
adjusting the receiver unit to steer a receiving pattern toward the reflector;
if the receiver unit cannot form a connection with the transmitter unit through the reflector, adjusting the flexible mount of the reflector, using a motor in the flexible mount, into a direction that forms a non-line-of-sight path between the transmitter unit and the receiver unit; and
electromagnetically broadcasting link status information for the transmitter and the receiver using a broadcast device at a frequency low enough to pass through obstacles that absorb mmWave frequencies,
wherein the signal strength detector and the broadcast device are disposed within apertures in the reflector.

14. The method of claim 13, wherein the adjusting is automatically performed by adjustment mechanisms within the reflector.

15. The method of claim 13, wherein the reflector includes a convex reflecting surface.

16. The method of claim 13, wherein adjusting the transmitter unit includes iteratively testing transmitter beam positions until a received signal strength at the reflector exceeds a threshold.

17. The method of claim 13, wherein adjusting the receiver unit includes iteratively testing receiving pattern positions until a received signal strength at the receiver unit exceeds a threshold.

18. The method of claim 13, wherein adjusting the transmitter unit and adjusting the receiver unit is repeated after adjusting the flexible mount of the reflector.

19. The method of claim 13, further comprising communicating a link status between the transmitter unit and the reflector to trigger adjusting the receiver unit.

20. A computer readable storage medium comprising a computer readable program, wherein the computer readable program when executed on a computer causes the computer to perform the steps of:
adjusting a flexible mount of a reflector having a reflective surface until a signal from a transmitter is detected;
determining a link state between the transmitter and a receiver by way of the reflector using a signal strength detector;
adjusting the flexible mount, using a motor in the flexible mount, into a direction that forms a non-line-of-sight path between the transmitter unit and a receiver unit based on the determined link state; and
electromagnetically broadcasting link status information for the transmitter and the receiver from the reflector using a broadcast device at a frequency low enough to pass through obstacles that absorb mmWave frequencies,
wherein the signal strength detector and the broadcast device are disposed within apertures in the reflector.

* * * * *